Figure 5:
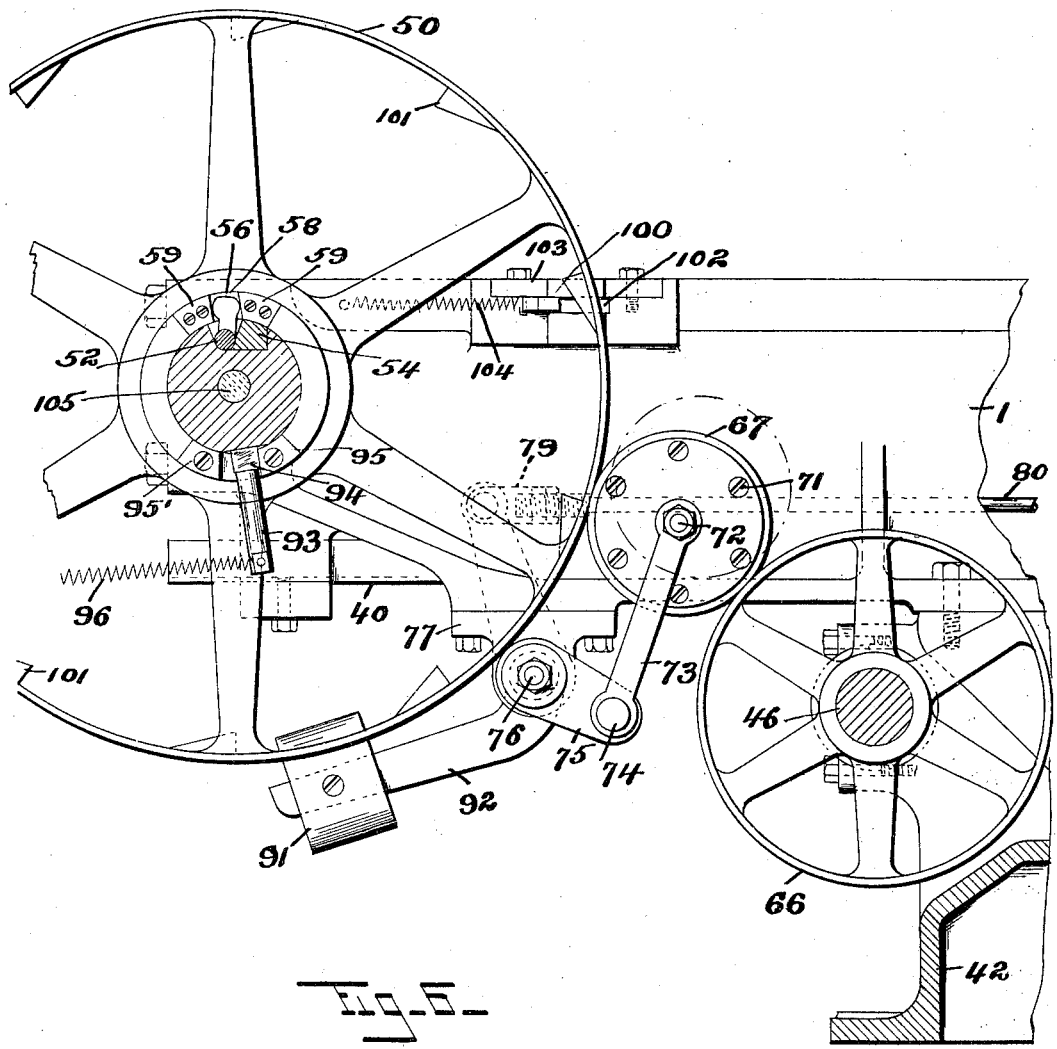

No. 736,605. PATENTED AUG. 18, 1903.
G. B. LAMB & D. C. GRIGGS.
DRAW BENCH.
APPLICATION FILED MAR. 21, 1902.
NO MODEL. 7 SHEETS—SHEET 1.
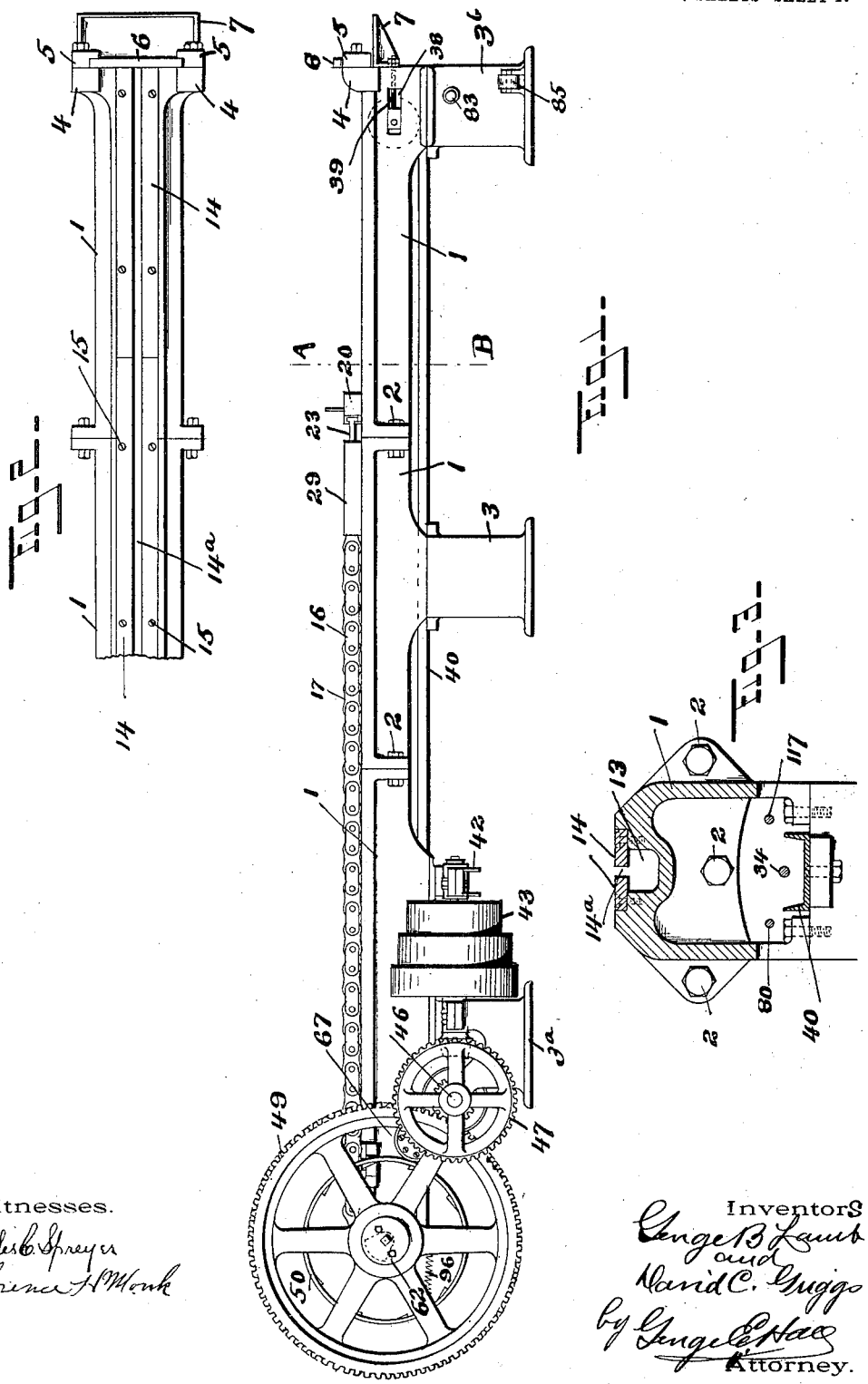
Witnesses.
Inventors
George B. Lamb
and
David C. Griggs
by George E. Hall
Attorney.

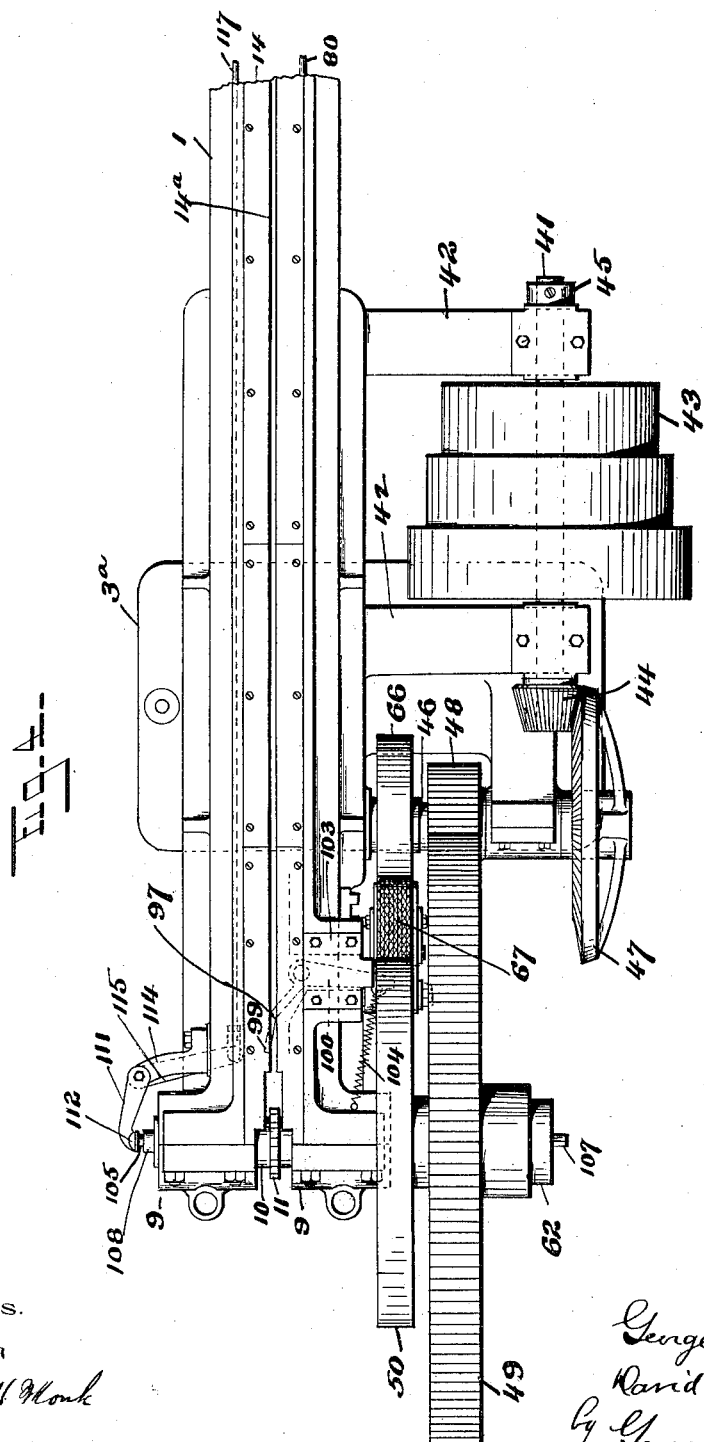

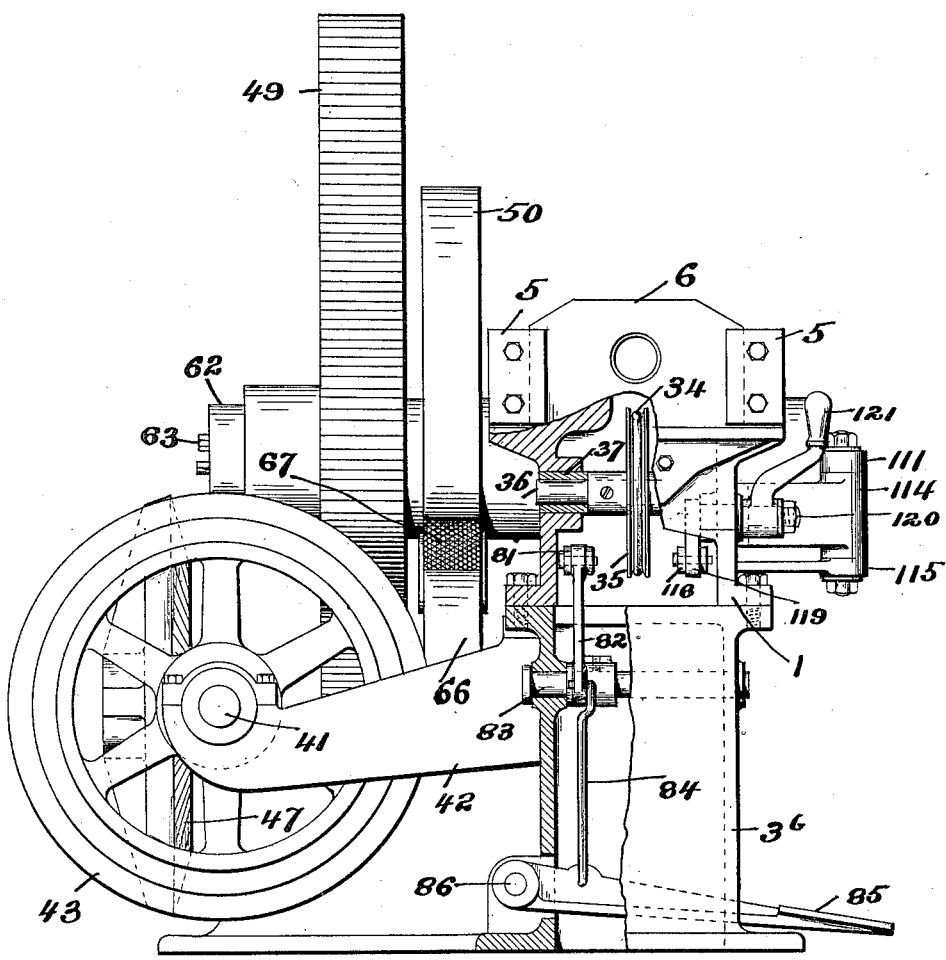

No. 736,605. PATENTED AUG. 18, 1903.
G. B. LAMB & D. C. GRIGGS.
DRAW BENCH.
APPLICATION FILED MAR. 21, 1902.
NO MODEL. 7 SHEETS—SHEET 4.

Witnesses. Inventors.
Charles C. Spreyer George B. Lamb
Florence H. Monk and
David C. Griggs
by George E. Hall
Attorney.

No. 736,605. PATENTED AUG. 18, 1903.
G. B. LAMB & D. C. GRIGGS.
DRAW BENCH.
APPLICATION FILED MAR. 21, 1902.
NO MODEL. 7 SHEETS—SHEET 5.
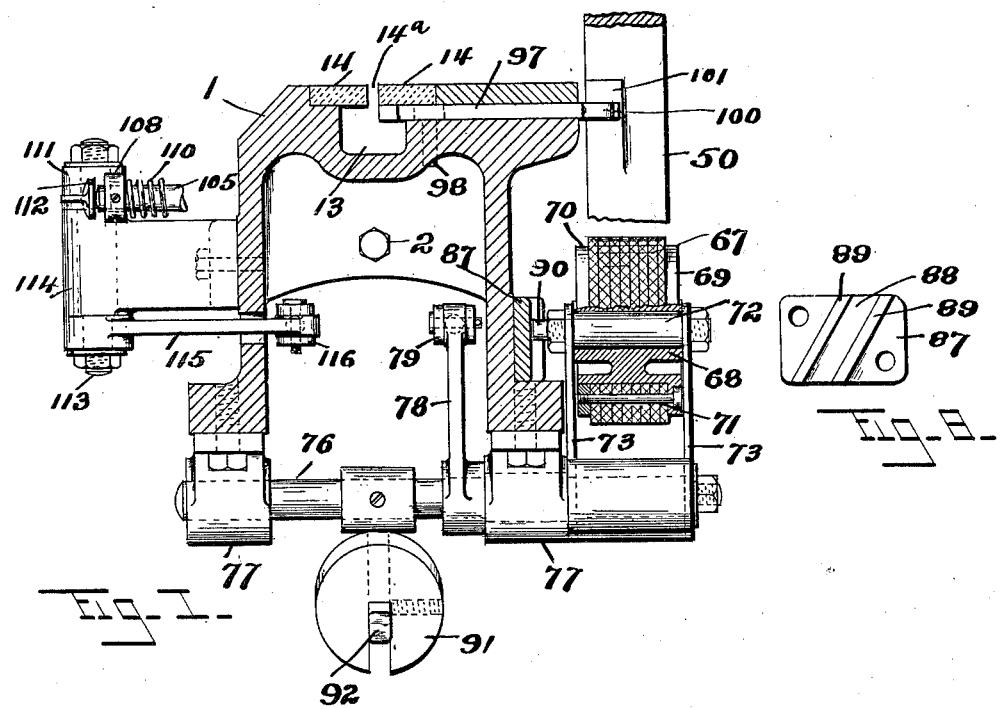
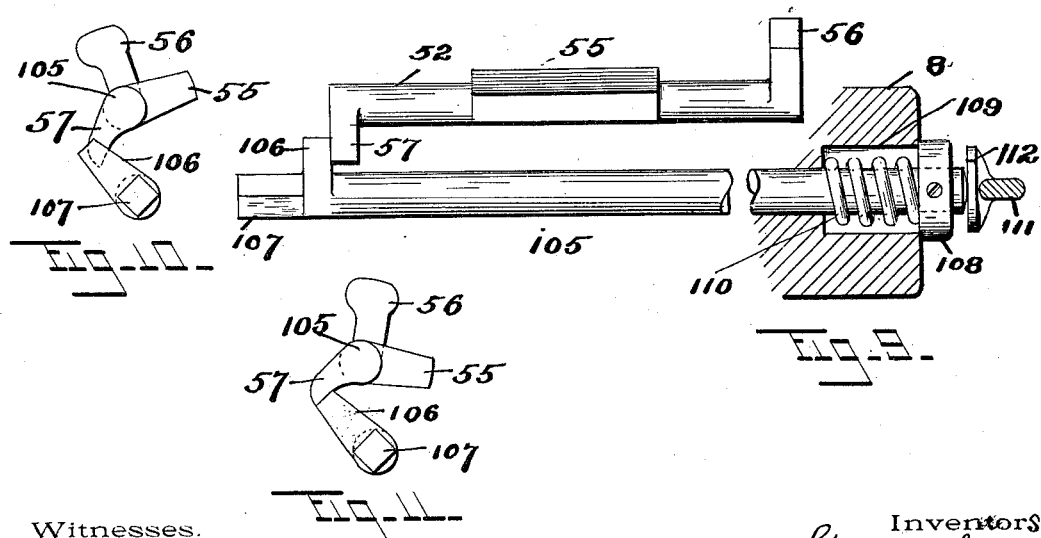
Witnesses.
Charles C. Spreyer
Florence H. Mark
Inventors
George B. Lamb
and
David C. Griggs
by George E. Hall
Attorney.
THE NORRIS PETERS CO., PHOTO-LITHO., WASHINGTON, D. C.

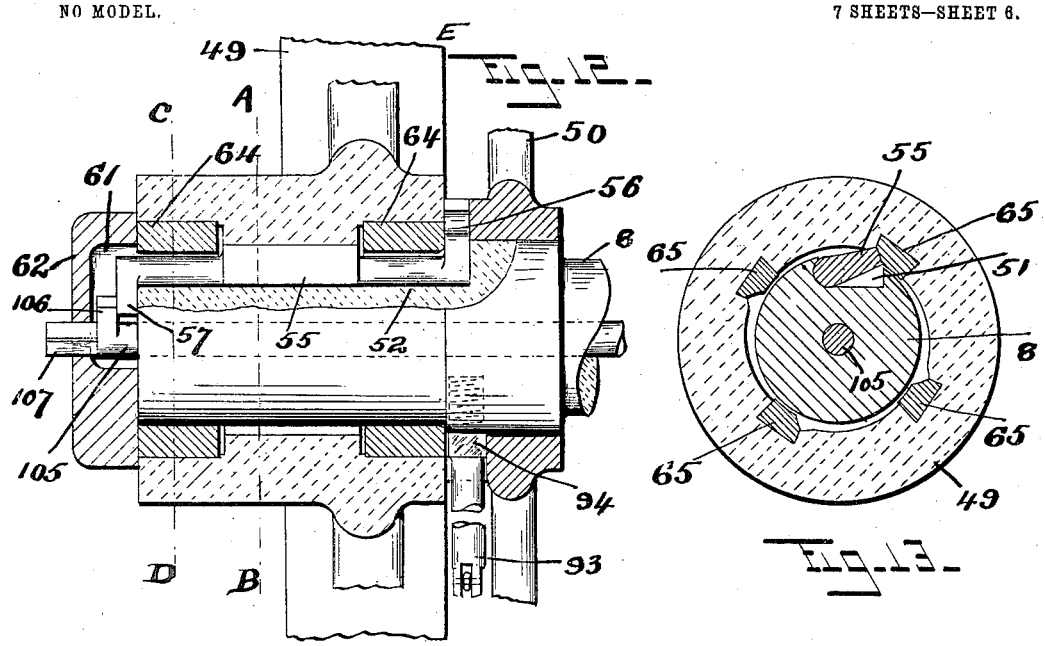
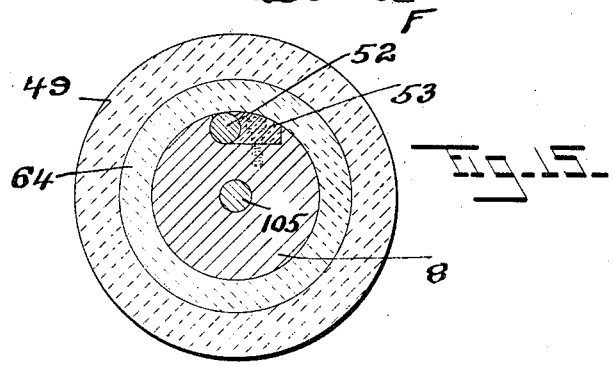
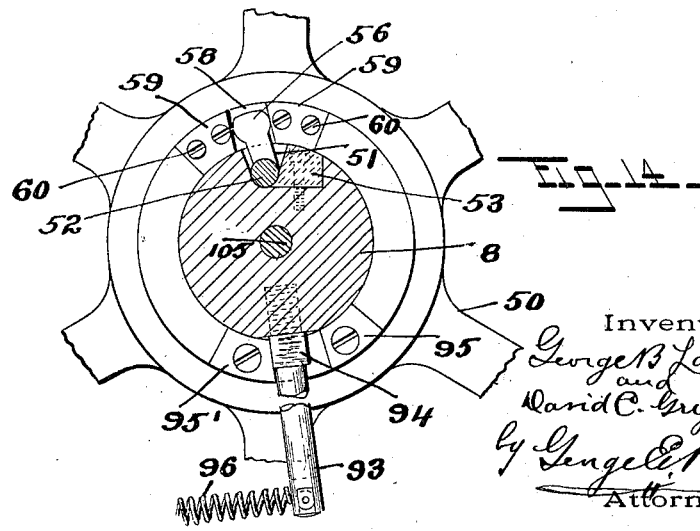

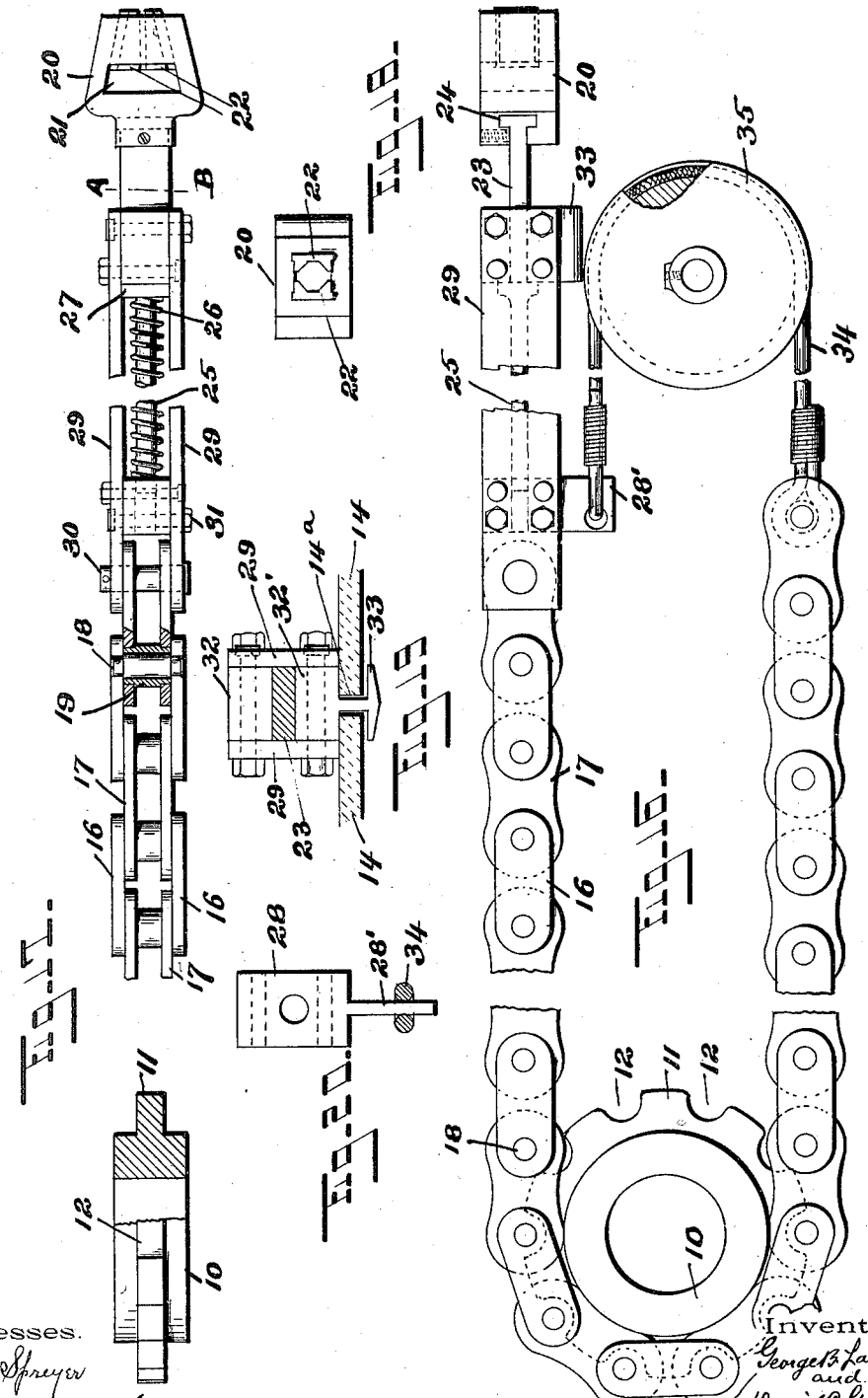

No. 736,605. Patented August 18, 1903.

UNITED STATES PATENT OFFICE.

GEORGE B. LAMB AND DAVID C. GRIGGS, OF WATERBURY, CONNECTICUT.

DRAW-BENCH.

SPECIFICATION forming part of Letters Patent No. 736,605, dated August 18, 1903.

Application filed March 21, 1902. Serial No. 99,306. (No model.)

*To all whom it may concern:*

Be it known that we, GEORGE B. LAMB and DAVID C. GRIGGS, citizens of the United States, residing at Waterbury, in the county of New Haven and State of Connecticut, have invented certain new and useful Improvements in Draw-Benches, of which the following is a specification, reference being had therein to the accompanying drawings.

Our invention relates to improvements in draw-benches, and refers more especially to that class of draw-benches in which the gripping devices are connected with a link chain that is actuated from a sprocket-wheel.

It is the object of our invention, among other things, to construct a draw-bench of this general character in which the center of the drawing-die will be in a direct line with the center line of the chain; to provide means whereby that portion of the chain between the gripping mechanism and the drawing-die will be inclosed, so that no portion of the said chain shall be exposed underneath the work while being drawn or after it is finished; to provide means whereby the gripping mechanism can be returned after each drawing operation at an increased speed; to provide means whereby all of the mechanisms can be actuated and controlled from the forward end of the draw-bench, which means shall be so located as to be within the reach of the operator.

It is a further object of our invention to make a draw-bench of this character with the fewest possible parts, so designed as to be economically manufactured and readily assembled.

To these and other ends our invention consists in a draw-bench having certain details of construction and combination of parts, as will be hereinafter described, and more fully pointed out in the claims.

Referring to the drawings, in which like numerals designate like parts in the several figures, Figure 1 is a side elevation of the draw-bench complete. Fig. 2 is a partial plan view of the front end. Fig. 3 is a section thereof upon line A B of Fig. 1. Fig. 4 is a plan view of the rear end. Fig. 5 is a fragmentary front elevation thereof. Fig. 6 is a fragmentary side elevation of the rear end of the machine. Fig. 7 is a transverse fragmentary sectional view of a portion of the draw-bench near the rear end thereof. Fig. 8 is a detail view of the idler guide-plate. Fig. 9 is a view of the clutch-pin and the starting-latch with a fragmentary view of a portion of the adjacent mechanism. Fig. 10 is a side elevation of the clutch-pin and starting-latch occupying their relative positions shown in Fig. 9 in which position the starting-latch is out of engagement with the clutch-pin; and Fig. 11 is a similar view of the same parts with the starting-latch in engagement with the clutch-pin. Fig. 12 is a fragmentary sectional view of the main gear-hub and friction-pulley with their adjacent mechanisms. Fig. 13 is a transverse section of the hub of the main gear upon line A B of Fig. 12. Fig. 14 is a view of the hub of the friction-pulley with the parts shown in section upon line E F of Fig. 12. Fig. 15 is a transverse section of the main gear-hub upon line C D of Fig. 1. Fig. 16 is a side elevation of the gripping and chain mechanisms. Fig. 17 is a plan view thereof. Fig. 18 is a front view of the gripper-block. Fig. 19 is a front view of the draw-bar frame with the draw-bar shown in section upon line A B of Fig. 17, and Fig. 20 is a front view of the rope-block detached from the draw-bar frame.

In the draw-bench herein described the gripping mechanism is connected with a link chain and has a reciprocating longitudinal movement upon the top of a suitable bed-plate, the said chain being actuated by means of a sprocket-wheel fixed upon a shaft in one end of the machine. The linked portion of the chain is only of sufficient length to extend to the drawing-dies and around the sprocket-wheel, the two ends thereof then being joined by a wire rope or other like means, which rope portion forms that part of the chain which does not take the drawing pull or strain, and hence can be made of a lighter and cheaper material, reducing materially the cost of the chain. We are enabled only to use this construction from the fact that the chain moves backward and forward and does not have a continuous movement in one direction, as is common in draw-benches heretofore made.

The drawing-die is rigidly held in the head of the bench with the center thereof in a line with the center line of the chain, and the drawing pull upon the chain is therefore in a direct horizontal line. The strain and pull upon the chain being in a direct line overcomes many objections in the draw-benches heretofore made, in which an endless chain has had a continuous movement in one direction, with the gripping mechanism elevated above the chain and the center of the drawing-die being in a line with the center of the gripping mechanism only and not with the gripping mechanism and chain combined, as in our construction. In this old construction, where the chain and die were in different horizontal planes, the engagement of the gripping mechanism with the chain caused the same to be raised from the bed of the machine, and the drawing pull or strain was then in a direct line from the sprocket-wheel at one end of the bench to the center of the drawing-die at the opposite end.

In our construction, in which the die, gripping mechanism, and chain are all in the same horizontal plane and in a direct line with each other, less power is required to operate the draw-bench, while the chain and gripping mechanism move noiselessly upon the top of the bed and are never lifted therefrom, thus reducing materially the wear upon the bed-plate and saving much of the repair required in the old style of draw-bench.

The chain passes around a sprocket-wheel at one end of the bench and is supported beneath the bed-plate by a channel-beam, being connected by means of a wire rope with the gripping mechanism, which wire rope lies in a covered rope-trough in the top of the bed-plate. It will be thus observed that the drawn stock is not over a chain, as in the constructions common in the art at the present time, but is suspended over a flat surface, and when the gripping mechanism releases its grip upon the same the finished work does not drop upon a moving chain, which is liable not only to injure and mar its outer surface, but is also liable to injure the operator while removing the same.

The main driving-shaft, upon which the sprocket-wheel is fixed, is rotated in one direction by a gear which has a separable connection with said shaft and is rotated in the reverse direction by means of friction mechanism engaging with a friction-pulley upon the said shaft, there being a clutch-pin connection between the said gear and the said friction-pulley.

The above-mentioned friction mechanism is actuated by a treadle at the forward end of the bench, and when a friction idler-wheel forming part of said mechanism is held in engagement with the friction-pulley upon the main shaft the gripping mechanism is returned to its original forward position ready to grip the next piece of stock placed in the bench.

In the drawings the numeral 1 designates the bed-plate, preferably made in sections secured together by the bolts 2, mounted upon suitable standards 3 3$^a$ 3$^b$. At the front end of the bed-plate is the drawing-die 6, held in a vertical position by the caps 5 5 against the head portions 4 4 of the bed-plate, and beneath the said die and secured to the end of the bed-plate is the usual apron 7. The particular form or construction of the die mechanism and manner of holding the same is not material to our invention, as any form of die or holder may be used.

Rotatably mounted in suitable bearings at the rear end of the bed-plate is the main shaft 8, being held therein by the caps 9 9, and rigidly fixed upon said shaft is a sprocket-wheel 10, having a flange 11 thereon of a width slightly narrower than the width of the open space between the links of the chain and within the periphery of which is a plurality of semicircular recesses 12. The bed-plate 1 is formed with a rope-trough 13 in its upper surface, and covering the same are the caps 14 14, which are preferably secured by the screws 15 to the bed-plate, with an open space 14$^a$ between the inner edges of said caps.

The chain is constructed with outside links 16 and inside links 17, which links are pivotally secured together by means of joint-pins 18 and sleeves 19, the said sleeves being reduced in diameter and forced at either end into the inside links 17, with the joint-pin 18 rotatably fitted into said sleeve and riveted at either end to the outside links, Fig. 17. By securing the links together, as described, we provide a large and long bearing-surface for the joint-pins, and thereby make a connection that will not be readily destroyed by wear and which will be cheap and economical to construct.

The inside links 17 are rounded, as shown in Fig. 16, so as to fit snugly upon the hub of the sprocket-wheel 10 as the same pass around the wheel, Fig. 16, the semicircular recess 12 in said wheel being of substantially the same diameter as the outside diameter of the sleeve 19.

The gripping mechanism comprises a block 20, having a recess 21 therethrough and carrying two gripping-dies 22 22, which dies have parallel inner faces and beveled outer faces, as shown in Fig. 17. The style or mode of operation of these dies is not material to our invention, as any form of gripping mechanism may be used; but the form shown is the one we prefer. When the stock is placed between the inner faces of the dies 22 22 and the drawing pull exerted upon the block 20, the dies move in toward each other by reason of their beveled outer faces and grip and hold the stock so long as the drawing pull is maintained. The block 20 is yieldingly connected with the chain through the draw-bar 23, which is provided with a T-head 24, which enters a corresponding transverse recess in the rear end of the block 20, (see Fig. 16,) and is provided with a circular shank 25, which is encircled by the coil-spring 26, one end of which abuts against the shoulder 27 upon the draw-bar and the other end against the rope-block 28. Upon either side of the draw-bar is the draw-bar frame, which comprises two plates 29 29, connected at their rear ends to the chain by the pin 30 and separated by the rope-block 28, secured to the plates by the studs 31, with the forward end of said plates separated by the filler-blocks 32 32', between which the draw-bar 23 has a sliding movement. The lower filler-block 32' is provided with the depending T-shank 33, the narrower portion of said shank passing through the slot 14$^a$ between the plates 14 14 and the head portion lying underneath the said caps and moving within the rope-trough 13. This shank prevents any upward or lateral movement of the gripper mechanism, as will be readily understood from Fig. 19. That portion of the chain which is composed of the links 16 and 17 is of sufficient length to extend from the dies at one end of the bench around the sprocket-wheel 10 at the other end, with the balance of the chain formed by a wire rope 34, secured at one end between two of the inside links 17 and at the other end secured to the depending tongue 28' upon the rope-block 28, which projects downward therefrom through the slot 14' and into the rope-trough 13. This rope connection passes around an idler-sheave 35, fixed upon a shaft 36, rotatable within the idler-boxes 37, which boxes are fitted into and adjustable horizontally within the slots 38 in the side of the bed-plate 1 by means of the adjusting-screws 39, threaded into the idler-boxes at their inner ends and provided with jam-nuts upon their outer ends, Fig. 1. The rope and chain beneath the bed-plate are supported by a suitable channel-bar 40, which extends substantially the whole length of the bench and rests upon the standards 3 3$^a$ 3$^b$. We prefer to connect the links at the opposite ends of the chain by a wire rope, as shown, but do not desire to be limited thereby, as a link chain of cheaper construction or other means can be used equally as well.

As the rope 34 is secured to the gripper mechanism beneath the caps 14 and within the rope-trough 13, no portion of the chain or of the operating parts are exposed between the gripper mechanism and the die-block, a decided advantage in machines of this character, as the finished stock when released from the gripper mechanism cannot drop onto moving parts or onto a surface that is liable to mar or damage it in any way.

The numeral 41 designates a driving-shaft which is journaled in brackets 42 upon the bed-plate 1 and to which is fixed the cone-pulley 43, bevel-pinion 44, and collar 45; 46, a shaft journaled at right angles to the shaft 41 and carrying a bevel-gear 47, the teeth of which mesh into the teeth of the bevel-pinion 44; 48, a spur-pinion which meshes into and drives a spur-gear 49 upon the main shaft 8, and 50 is a friction-pulley also mounted upon the said main shaft 8.

Within a recess 51 in the periphery of the main shaft 8 is clutch-pin 52, with its axis parallel to the axis of said shaft and held in said recess by the blocks 53 and 54, which are fastened to said shaft by screws, as shown in Figs. 14 and 15. The clutch-pin 52 is cylindrical for substantially the whole of its length and is provided with an integral clutch-arm 55, terminating at one end in a rock-arm 56 and at the other end in a latch-arm 57, the said rock-arm lying within a recess 58 in the hub of the friction-pulley 50, formed between the wearing-pieces 59 59, secured to the face of said hub preferably by means of screws 60, as herein shown. The latch-arm 57 projects toward the center of the shaft 8 and across its outer end, as shown in Fig. 12, within the recess 61, formed in the collar 62, secured upon the end of the shaft 8 by means of the bolts 63. Inserted within either end of the hub of the gear 49 are bronze bushings 64 64, which are bored the same diameter as that of the main shaft 8 and provide bearings for the gear upon said shaft. Between the bushings 64 and embedded in dovetail grooves within the hub of the gear 49 are the clutch-keys 65 65.

When the clutch-arm 55 is in engagement with one of the clutch-keys 65, as shown in Fig. 13, the gear 49 is fixed to the main shaft 8 and the said shaft is rotated by means of this gear; but when the said clutch-arm 55 is caused to drop into the recess 51 by means hereinafter to be described the connection between said gear and shaft is broken and the said gear rotates about the said shaft without imparting movement thereto. The connection between the gear 49 and the shaft 8 during the drawing operation—that is, when the gripping mechanism is moving from the forward to the rear end of the bench—is shown in Fig. 13.

The friction devices for returning the gripping mechanism for a new drawing operation consist of a friction-pulley 66, fixed upon the shaft 46, the before-mentioned friction-pulley 50, which is mounted upon the main shaft 8, and the intermediate friction idler-wheel 67. This friction idler-wheel is preferably made with a plurality of leather disks, as shown in Fig. 7, mounted upon a central hub 68, having a flange 69 upon one side, an annular plate 70 upon the opposite side, and a plurality of bolts 71, which pass through the flange 69 and leather disks and threaded into the plate 70. The friction idler-wheel 67 is rotatably mounted upon a shaft 72, fixed at either end in the links 73 73, which links are secured by a pin 74 to a rock-arm 75, which is fixed to a rock-shaft 76, journaled in bearings 77, secured to the under side of the bed-plate 1. Upon the rock-shaft 76 is a lever 78, to which is secured a clevis 79, threaded upon one end of the bar 80, which extends to the forward end of the bench, where it is threaded into a clevis 81, fixed to the upper end of a rock-lever 82, keyed to the shaft 83. Also attached to the rock-lever 82 is a rod 84, having connection at its lower end with a treadle 85, which is pivotally secured to the stand 3^b upon the pin 86. By depressing the treadle 85 the rock-lever 82 is caused to oscillate, which movement is imparted to the rock-shaft 76 through the rod 80 and the lever 78, and the friction idler-wheel 67 is drawn down and held in engagement with the peripheries of the friction-pulleys 50 and 66, as shown in Fig. 6, and the movement of the pulley 66 is imparted to the pulley 50. To insure a vertical movement of the idler-wheel 67 and still prevent a premature engagement with either of the friction-pulleys 50 or 66, we have provided a guide-plate 87, which is bolted to one side of the bed-plate 1 and is provided with an angular slot 88, which is formed between the ribs 89 89 integral with the said guide-plate and into which radial slot projects the end 90 of the shaft 72. As the shaft 72 is moved vertically through the means heretofore described the engagement of the end 90 of the shaft 72 with the sides of the slot 88 causes the said idler-wheel to be guided and held out of engagement with the peripheries of either of the friction-pulleys 50 and 66. To return the idler-wheel to its non-engagement position (shown by broken lines in Fig. 6) after the pressure upon the treadle 85 has been released, an adjustable counterweight 91 is fixed upon a counterweight-arm 92, secured to the rock-shaft 76. It will be apparent that as soon as the pressure upon the treadle is removed the counterweight will cause the rock-shaft 76 to oscillate, and through its connection with said shaft the idler-wheel will be lifted and held out of engagement with the friction-pulleys.

Fixed in the main shaft 8 and projecting radially therefrom is the stop-pin 93, which stop-pin is provided with a squared portion 94, which is movable within a recess formed between the wearing-pieces 95 95', set in the hub of the friction-pulley 50. While the main shaft is being rotated by the gear 49 the spring 96, which is secured at one end to the stop-pin 93 and at the other end to one of the arms of the friction-pulley 50, holds and retains the said pulley in such a position that the wearing-piece 95' is against the squared portion 94 of the stop-pin, as shown in Fig. 14. The engagement of this stop-pin with the hub of the pulley, as just described, causes the said friction-wheel 50 to rotate with the main shaft and is the sole means of driving said pulley when the shaft is being driven by the gear 49.

To automatically stop the movement of the gripping mechanism when it has substantially reached its rearmost position, we have provided a mechanism which automatically stops the movement thereof by actuating the clutch-pin 52 and breaking the connection between the gear 49 and the shaft 8. This mechanism comprises a stop-lever 97, pivotally secured to the bed-plate 1 by the pin 98 and provided with an arm 99, which projects across the rope-trough 13 underneath the slot 14^a, and a pulley-arm 100, which projects outside of the bed-plate 1 and into the path of rotation of a plurality of lugs 101, integral with the inside of the rim of the friction-pulley 50. This lever 97 is operative within a recess 102, formed in the bed-plate and covered by a cap 103, bolted thereto. A spring 104 normally holds the stop-lever 97 in such a position that the arm 100 is out of the path of movement of the lugs 101, and the arm 99 is extended across the slot 14^a, as shown in Fig. 4.

As the gripping mechanism approaches the rear end of the bench the tongue 28' upon the rope-block 28 engages with the arm 99 of the stop-lever, causing it to oscillate upon its pivot-mountings against the action of the spring 104, and throws the arm 100 into the path of movement of the lugs 101. As one of the lugs 101 engages with the arm 100 of the stop-lever the friction-pulley 50 is brought to an abrupt stop, and as the main shaft 8 continues its movement the engagement of the rock-arm 56 upon the clutch-pin 52 with the wearing-piece 59 59 upon either side of the recess 58 causes the clutch-pin to rotate upon its axis until the clutch-arm 55 drops out of engagement with the clutch-key 65 and into the recess 51 in the main shaft, severing the connection between the gear 49 and the main shaft, which is brought to a full stop, while the gear continues to rotate. The positions of the clutch-pin 52 and of the stop-pin 93 when the parts are brought to rest are shown in Figs. 6 and 11.

Movable lengthwise within an axial bore in the main shaft 8 is a latch-rod 105, having an integral latch 106 thereon adjacent to one end, which end is squared at 107 and fitted into a square hole in the washer 62, which prevents rotation of the said latch-rod about its axis. Fixed to the opposite end of said latch-bar is a collar 108, between which and the bottom of a recess 109 in one end of the shaft 8 is a coil-spring 110.

The relative positions of the latch-arm 57 and the latch 106 during the rotation of the main shaft 8 when being driven by the gear 49 are shown in Figs. 9 and 10, in which positions the coil-spring 110 holds the inner face of the latch 106 against the outer face of the latch-arm 57. When the clutch-pin 52 rotates upon its own axis by reason of the stoppage of the friction-pulley 50, the latch-arm 57 is lifted sufficiently to free the latch 106, which is then moved longitudinally by the spring 110, so that the latch is beneath the latch-arm 57 (see Fig. 11) and prevents further movement of the clutch-pin 52 until the said latch has been released from engagement with the latch-arm. The mechanism for moving this latch-rod 105 longitudinally, so as to release the clutch-pin, comprises a lever 111, having a pad 112 thereon, which engages with the end of the latch-rod 105, the said lever being fixed upon the upper end of a rock-shaft 113, which is mounted in a bracket 114, fastened to one side of the bed-plate, a lever 115, fixed to the lower end of the said rock-shaft, a clevis 116, pivotally secured to the said lever 115, in which clevis is threaded the end of a rod 117, which extends under the said bed-plate to the forward end of the bench and is there connected by a clevis 118 with an arm 119, integral with a rock-shaft 120, and a hand-lever 121, fixed upon said shaft 120. When it is desired to release the latch 106 from the latch-arm 57, the operator grasps the lever 121, and by imparting to the rod 117 a longitudinal movement through its connection with the shaft 120 the said lever 111 is oscillated and the latch-rod 105 is given an endwise movement against the tension of the spring 110, and the latch is pushed out of engagement with the latch-arm.

After the gripping mechanism has been stopped automatically by the engagement of the stop-lever with one of the lugs within the rim of the friction-pulley 50 the gripping mechanism is returned to its forward position by the operator placing his foot upon the treadle 85, causing the friction idler-wheel 67 to be brought into engagement with the peripheries of the friction-wheels 50 and 66, as before described. The pulley 50 now rotates in a reverse direction from that when being driven by the gear 49, and the face of the wearing-piece 95 is brought up against the squared portion 94 upon the stop-pin 93, which forms a connection between the friction-pulley 50 and the main shaft, (see Fig. 6,) and by means of this connection the main shaft is caused to rotate in a reverse direction, returning the gripping mechanism to the forward end of the bench preparatory to another drawing operation. During this operation the clutch-arm 55 is within the recess 51 in the main shaft 8 and out of engagement with the clutch-key 65, being held in such position by the latch 106, as before described.

The comparative sizes of the pulleys 66 and 50 with those of the pinion 48 and gear 49 are such that the speed of the shaft 8 while being driven by this friction mechanism is greater than when being driven by the gear mechanism. Hence the speed of the return movement of the gripping mechanism is much greater than its drawing movement. By varying the sizes of these pulleys the gripping mechanism can be returned at any desired speed.

To start up the mechanism for a drawing operation, the latch 106 is released from the latch-arm 57 through the lever 121, as before described, and immediately upon releasing the same the spring 96 through its engagement with one arm of the pulley 50 and the stop-pin 93 causes the said pulley to impart a partial rotation about the main shaft, bringing the face of the squared portion 94 upon the stop-pin 93 against the face of the wearing-piece 95', as shown in Fig. 14, and at the same time imparting a rocking movement to the clutch-pin 52 through the arm 56, lying in the recess 58, which movement causes the clutch-arm 55 to move out of the recess 51 in the shaft 8 and project outside of the periphery thereof, so that as one of the keys 65 comes in contact therewith the engagement between said shaft and said pulley is completed and the shaft is caused to rotate, as before described.

There are many minor changes and alterations that can be made within our invention, and we would therefore have it understood that we do not limit ourselves to the exact construction herein shown and described, but claim all that falls fairly within the spirit and scope of our invention.

What we claim as new is—

1. In a draw-bench, the combination with a bed-plate; of a drawing-die separably fixed thereto; a draw-chain; and a gripping mechanism movable upon the said bed-plate and connected with said draw-chain, that portion of said draw-chain upon said bed-plate being in line with the gripping mechanism and that portion between said gripping mechanism and drawing-die being below said bed-plate, substantially as described.

2. In a draw-bench, the combination with a bed-plate; of a drawing-die; a draw-chain; and a gripping mechanism connected with the said draw-chain, said draw-chain being mounted so that during the drawing operation those portions of said draw-chain in front and rear of said gripping mechanism travel in different horizontal planes, substantially as described.

3. In a draw-bench, the combination with a bed-plate having an inclosed trough in its upper surface; of a drawing-die; a draw-chain, the upper portion of which is movable upon the top of said bed-plate; and a gripping mechanism secured to said draw-chain with its center in line with the center of the link-pins of said draw-chain and having a tongue projecting downwardly into said trough, to which one end of said draw-chain is secured, substantially as described.

4. In a draw-bench, the combination with a bed-plate; of a drawing-die separably fixed thereto; a draw-chain; a gripping mechanism movable upon the said bed-plate and connected with said draw-chain, that portion of said draw-chain upon said bed-plate being in line with the gripping mechanism and having the same horizontal and vertical center line as said drawing-die and that portion between said gripping mechanism and drawing-die being below said bed-plate, substantially as described.

In testimony whereof we affix our signatures in presence of two witnesses.

GEORGE B. LAMB.
DAVID C. GRIGGS.

Witnesses:
LEWIS E. FULTON,
W. J. MATON.